(12) United States Patent
Moenkemoeller

(10) Patent No.: US 9,000,888 B2
(45) Date of Patent: Apr. 7, 2015

(54) CONTROL DEVICE OF AN OPERATING ELEMENT IN A MOTOR VEHICLE

(71) Applicant: Ralf Moenkemoeller, Bielefeld (DE)

(72) Inventor: Ralf Moenkemoeller, Bielefeld (DE)

(73) Assignee: paragon AG, Delbrueck (DE)

( * ) Notice: Subject to any disclaimer, the term of this patent is extended or adjusted under 35 U.S.C. 154(b) by 53 days.

(21) Appl. No.: 13/786,605

(22) Filed: Mar. 6, 2013

(65) Prior Publication Data

US 2013/0241691 A1    Sep. 19, 2013

(30) Foreign Application Priority Data

Mar. 16, 2012   (DE) .......................... 10 2012 005 371

(51) Int. Cl.
   *G05B 19/00*   (2006.01)
   *H04B 5/00*    (2006.01)

(52) U.S. Cl.
   CPC ............ *H04B 5/0025* (2013.01); *H04B 5/0043* (2013.01)

(58) Field of Classification Search
   CPC ............. G07C 9/00309; H04B 5/0025; B60K 2350/1012; B60N 2/02
   USPC ............................... 340/5.2, 438, 572.1, 10.1
   See application file for complete search history.

(56) References Cited

U.S. PATENT DOCUMENTS

| 4,796,013 | A * | 1/1989 | Yasuda et al. ................. 340/562 |
| 6,275,146 | B1 * | 8/2001 | Kithil et al. ................. 340/425.5 |
| 6,520,535 | B1 * | 2/2003 | Stanley et al. ................. 280/735 |
| 7,545,270 | B2 * | 6/2009 | Pickering et al. ............. 340/561 |
| 8,626,380 | B2 * | 1/2014 | Styles et al. ................... 701/36 |
| 2007/0032912 | A1 * | 2/2007 | Jung et al. ........................ 701/1 |

FOREIGN PATENT DOCUMENTS

DE    4301160 A    7/1994

\* cited by examiner

*Primary Examiner* — Eric M Blount
(74) *Attorney, Agent, or Firm* — Andrew Wilford

(57) ABSTRACT

A receiver belongs to a control device of an operating element in a motor vehicle, which receiver is a component part of the operating element and into which signals are able to be inputted by a person. In order to be able to establish with great reliability a threshold for the decision 'signal valid/signal invalid", it is proposed defined in the invention that the receiver of the operating element has a first coupling-in element and a second coupling-in element, which are arranged at a defined distance from one another on an evaluation axis.

16 Claims, 1 Drawing Sheet

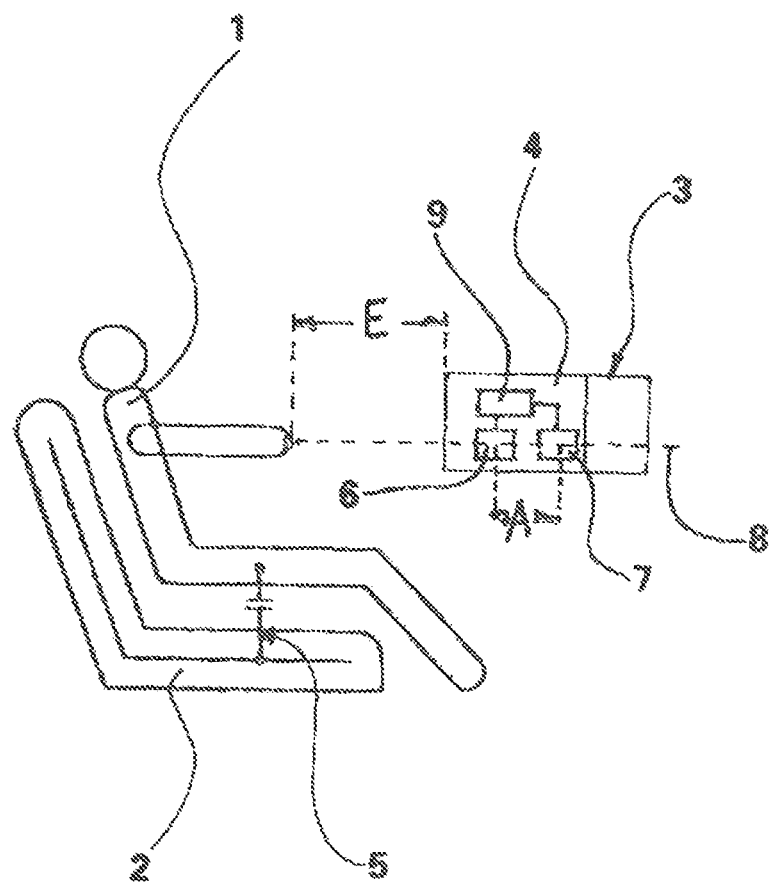

CONTROL DEVICE OF AN OPERATING ELEMENT IN A MOTOR VEHICLE

FIELD OF THE INVENTION

The invention relates to a control device of an operating element in a motor vehicle, with a receiver that belongs to the operating element and that can receive signals emitted by a person.

BACKGROUND OF THE INVENTION

This control device is able to be configured by means of near-field communication so that a person can be identified, wherein in particular the differentiation can implemented between passenger and driver or the driver can be recognized.

It is to be ensured hereby that particular actions or interventions with equipment, e.g. the selecting of a drive position in an automatic gearbox, can only be carried out by the is driver.

A corresponding control device is known from DE 43 01 160 C2, in which the driver's seat and the passenger's seat are marked by a specific signal. In this known case, only the frequency of the signal is different and is allocated explicitly to the driver's seat or to the passenger's seat.

The marking signal is applied to the person situated on the seat via the seat frame or a suitable coupling surface. The actuating- or operating element is additionally configured as a signal receiver. In the case of an actuation of the actuating- or operating element, the body of the person forms a signal path for the marking signal. With the aid of the specific signal frequency, the operating element recognizes the person who is acting and can trigger or prevent corresponding actions.

Both the application of the marking signal and also its transmission is subject to great fluctuations. The signal level at the receiving element on the actuating side or operating element side can vary completely by a factor of 200. This is due, for example, to what clothing a person is wearing, whether possibly a seat cushion is being used on the vehicle seat or whether the person who is acting—for example in winter—is wearing gloves.

In the case of the known control device, a decision is made on the basis of the signal strength detected in the receiving element whether an actuation is present by the person. With the fluctuations of the signal strength described above, such a solution is not satisfactory, because it is only possible with a comparatively small degree of accuracy to establish a threshold for the "signal valid/signal invalid" decision.

OBJECT OF THE INVENTION

Proceeding from the prior art described above, the is invention is based on the problem of further developing the control device, described above, of an operating element in a motor vehicle such that with a much greater reliability than in the prior art and with a comparatively small technical/structural expenditure a distinct and exact threshold can be established for the "signal valid/signal invalid" decision.

SUMMARY OF THE INVENTION

This problem is solved according to the invention in that the receiver of the operating element has a first and a second input element that are arranged at a defined spacing from one another on an evaluation axis.

It is known from physics that an electrical or magnetic field drops off with a decreasing gradient at an increasing spacing from the field source. In the case of the invention, through the evaluation of the gradient of the electrical or magnetic signal field, wherein the magnetic field is linked with the electrical field according to Maxwell's equations, the spacing between the signal source and the operating element is able to be determined reliably.

For this, advantageously the quotient of the signal strength detected at the first input element of the receiver and the signal strength detected at the second input element of the receiver is used as the basis for the measuring or for the determining of the spacing between the signal source and the operating element.

As the quotient of the two signal strengths is used as a benchmark for the spacing, the spacing is only dependent on the ratio of the signal strength of the two signals and no longer on the absolute signal strength.

A specific signal for the person can be transmitted for example by means of a transmitter carried by the person.

If, alternatively, an electrical field coupled into the person functions as a signal, variable factors do not play a part in the coupling-in of the signal into the human body. The same applies for the transmission behavior of the human body. Also, the use of gloves has no influence on the determined spacing.

Advantageously, the first and the second input element of the receiver are field sensors, The field sensors of the receiver can be constructed expediently as magnetic field sensors, by means of which the specific signal transmitted from the transmitter for the person or a magnetic field corresponding to the electrical field coupled into the person is able to be evaluated. According to the invention, it is therefore possible to couple an electrical field into the body as a signal, wherein, however, the coupling elements of the receiver are magnetic field sensors, by means of which the magnetic field corresponding to the electrical field is evaluated.

Basically, it is possible to configure the field sensors of the receiver as field plates.

According to an advantageous embodiment, the field sensors of the receiver are field coils. The field coils can be evaluated free of potential and have a comparatively low impedance that lies distinctly below the impedance of field plates. The sensitivity of the field coils can be influenced with an extremely low expenditure by the number of windings applied.

According to a further advantageous embodiment, the sensitivity of the field coils can be drastically increased if a capacitor is associated with each field coil, which capacitor forms a resonant circuit with it that is coordinated with the frequency of the electrical field functioning as a signal.

According to a further advantageous embodiment of the invention, the control device has a coupling member, by means of which the signal is able to be coupled into the body of the person and which can be arranged for example on a vehicle seat or on a steering wheel.

A differentiation of different persons situated in the motor vehicle can be achieved by means that are minimally elaborate from a technical/structural point of view, when the specification of the signals associated with different persons situated in the motor vehicle or with different vehicle seats is realized by means of a presettable chronological sequence of the signals. Thus, for example, first the signal associated with the driver's seat, then with a chronological interval the signal associated with the passenger's seat, then with the same chronological interval the signal associated with the right rear seat, then with the same chronological interval the signal associated with the middle rear seat, and then with the same chronological interval the signal associated with the left rear seat are transmitted, before then—with an e.g. considerably greater chronological interval—again the signal associated with the driver's seat is transmitted. Further differences between the signals associated with different persons or vehicle seats are not then necessary.

According to an advantageous further development of the control device according to the invention, the first one coupling element and the second one coupling element can be configured so that the signal strengths detected by them at a presettable spacing, e.g. at an operating spacing between them and the signal source, are of equal magnitude. With correspondingly configured input elements, it is then particularly simple with regard to circuitry to configure a spacing-dependent switch. The forming of the quotient of the signal strengths detected by the receiver can be dispensed with, because it only still has to be decided in the control device whether the quotient lies above or below 1 or which of the two coupled-in signals is greater or stronger. For this, merely a simple comparator is necessary. If the spacing of the signal source is greater than the presettable spacing or the operating spacing, then the signal of the input element more remote from the signal source is greater than that of the coupling element nearer to the signal source. When the spacing between the signal source and the input elements corresponds exactly to the presettable spacing or the operating spacing, the signal strengths of the two input elements are of exactly equal magnitude. When the spacing between the signal source and the two input elements is smaller than the presettable spacing or the operating spacing, then the signal strength of the input element closer to the signal source is greater than the signal strength of the input element more remote from the signal source.

The corresponding configuration of the input elements can be brought about in a minimally elaborate manner from a technical/structural point of view if the field plate or the field coil of the input element further remote from the signal source is constructed so as to be correspondingly greater with regard to area or with more bindings than the field plate or the field coil of the input element closer to the signal source.

The configuration of the input elements explained above can be achieved in an even simpler manner from a technical/structural point of view if the input element closer to the signal source has a correspondingly configured downstream signal attenuator/

BRIEF DESCRIPTION OF THE DRAWING

The invention is explained in further detail below with the aid of an embodiment, with reference to the drawings, the single FIGURE of which shows a schematic diagram of an embodiment of a control device of an operating element according to the invention, in a motor vehicle.

SPECIFIC DESCRIPTION OF THE INVENTION

A person 1 has sat down on a vehicle seat 2. Inside a motor vehicle, not further illustrated, provided with the vehicle seat 2, an operating element 3 is provided that serves for the putting into operation, actuation, control etc. of downstream equipment. For example, a gear shift knob of a selector lever or such can be provided as the operating element 3.

The operating element 3 has a receiver 4. By means of the receiver 4, the person 1 situated on the vehicle seat 2 can input operating signals into the operating element 3.

In the illustrated embodiment of the control device according to the invention, a coupling member 5 is provided in or on the vehicle seat 2, by means of which a specific signal is able to be inputted into the body of the person 1. This signal is expediently an electrical signal here in the case of the control device according to the invention. The body of the person 1 becomes, as it were, a signal source.

In order to determine a spacing E between a hand of the person 1, forming a part of the person 1 or of the signal source on the one hand, and on the other hand the operating element 3 in a reliable manner and independently of the strength of the signal fed into the person 1, the receiver 4 of the operating element 3 has a first input element 6 and a second input element 7.

The two input elements 6, 7 are arranged on an evaluation axis 8. They have a predetermined defined spacing A with respect to one another on this evaluation axis 8.

At this point, it is to be pointed out that the electrical signal inputted into the person 1 by the coupling member 5 is specific and characteristic for the vehicle seat 2. In an evaluation unit 9 of the receiver 4 to which both the first input element 6 and also the second input element 7 of the receiver 4 are connected, an association can be brought about of the received signal to the vehicle seats. Through the near-field communication configured in such a way, the control device of the operating element 3, described above, is enabled to establish, on an actuation of the receiver 3, which of the persons 1 situated in the vehicle is operating the operating element 3. In particular, a differentiation can be undertaken here between the vehicle driver and other persons situated in the vehicle. This way, it can be ensured that particular operating procedures can be carried out exclusively by the motor vehicle driver and other operating procedures can in fact not be carried out by the motor vehicle driver.

In the illustrated embodiment of the control device, the quotient of the signal strength detected at the first input element 6 of the receiver 4 and of signal strength detected at the second input element 7 of the receiver 4 is formed in the evaluation unit 9 of the receiver 4.

In the evaluation unit 9, the gradient is evaluated of the electrical or magnetic signal field going back to the signal fed into the body of the person 1, the magnetic field being linked with the electrical field in accordance with the Maxwell's equations.

Accordingly, in the case of the illustrated embodiment an electrical field is fed into the body of the person 1 as a signal, and the first input element 6 and the second input element 7 of the receiver 4 are configured as magnetic field sensors or field coils 6, 7 for the evaluation of the magnetic field.

Instead of field coils 6, 7, field plates can also be provided. The configuration of the input elements 6, 7 as field coils 6, 7 has the result, however, that a potential-free evaluation of the signals detected by the field coils 6, 7 is possible. Furthermore, field coils 6, 7 have a considerably lower impedance than field plates that are able to be used alternatively.

Depending on the requirement profile for the receiver 4 of the operating element 3, the input elements 6, 7, field coils, can be provided with a corresponding number of the applied windings.

To increase the sensitivity, it is possible that a input element 6, 7, a field coil, forms a resonant circuit with an additionally provided capacitor. This resonant circuit is coordinated with the frequency of the electrical signal inputted into the body of the person 1.

As an electrical or magnetic field drops off with a decreasing gradient at an increasing spacing from the field or signal source, the spacing E between the operating element 3 and the signal source, for example the hand of the person 1, can be exactly determined in the evaluation unit 9 of the receiver 4.

This exact determining is independent of the signal level received in the receiver 4 of the operating element 3 of the electrical signal inputted into the person 1.

The arrangement of the two field coils 6, 7 one behind the other on the evaluation axis 8, indicated in principle in the FIGURE, prevents the first field coil 6 from shielding the magnetic or electrical field with respect to the second field coil 7.

The evaluation in the evaluation unit 9 of the receiver 4 takes place by simple measuring and detecting of the signal strength at the two input elements 6, 7 or field coils 6, 7. The quotient of the two detected signal strengths is used as a benchmark for the evaluation. Accordingly, the evaluation or determination of the spacing E is dependent exclusively on the ratio of the signal strength of the two signals detected at the field coils or input elements 6, 7, and no longer on the absolute signal strength. It is essential that the spacing A between the two input elements 6, 7 is predetermined and defined.

Any variable coupling factors that occur on the input of the electrical signal into the body of the person 1 by means of the coupling member 5 do not play any part with regard to the evaluation in the receiver 4 of the operating element 3. Also, the transmission behavior of human body of the person 1 or, for example, the use of gloves, influences exclusively the absolute signal strength, but not the quotient formed in the evaluation unit 9 of the receiver 4.

The smaller the spacing E between the signal- or field source and the operating element 3, the greater the quotient formed from the two signal strengths detected by the input elements 6, 7, which quotient serves as the basis for the detection or calculation of the spacing E.

In the embodiment described above, the coupling member 5, by means of which the electrical signal is inputted into the body of the person 1, is provided on the vehicle seat 2. Of course, it is also possible to provide a coupling member on the steering wheel, for example, instead of on the vehicle seat.

In the embodiments described above, the input elements 6, 7 arranged at a spacing from one another on the evaluation axis are constructed identically. This has the disadvantage technically that the input element 7 more remote from the signal source, for example from the hand of the person 1, receives a signal with a distinctly smaller signal strength. In the subsequent signal processing or evaluation unit 9 therefore in certain circumstances a higher signal enhancement is necessary for this input element 7. However, it is technically advantageous if an identical signal path can be used for both input elements 6, 7.

For this, according to a further embodiment of the control device according to the invention, the input elements 6, 7 are configured so that with a defined and presettable spacing or with the operating spacing between the signal source and the two input elements 6, 7, the signal fed into the latter is of equal magnitude. This can be realized with input elements 6, 7 equipped with field plates, for example in that the field plate of the input element 7 more remote from the signal source is configured accordingly to be larger with regard to area than the field plate of the input element 6 nearer to the signal source. In so far as the input elements 6, 7 are equipped with field coils, the field coil of the input element 7 more remote from the signal source can have more turns accordingly than the field coil of the input element 6 nearer to the signal source.

Alternatively, it is possible that the input element 6 nearer to the signal source is equipped with a correspondingly configured downstream signal attenuator.

Insofar as the input elements 6, 7 are configured so that the signal strength passed on from them to the evaluation unit, with the presettable spacing or operating spacing between the input elements 6, 7 and the signal source, are of equal magnitude, it is particularly simple with regard to circuitry to configure a switch dependent on spacing. The forming of the quotient between the two signal strengths is superfluous, because need only determine whether the quotient between the signal strengths lies above or below 1 or is equal to 1, which corresponds to the decision as to which of the signal strengths is greater. A simple comparator is sufficient for this.

If the spacing E between the signal source or the person 1 and the operating element 3 is greater than the presettable spacing or the operating spacing, then the signal strength of the input element 7 more remote from the signal source or the person 1 is greater than the signal strength of the input element 6 nearer to the signal source or the person.

Insofar as this spacing E corresponds to the presettable spacing or the operating spacing, the two signal strengths are of equal magnitude.

If the spacing E between the signal source or the person 1 and the receiver 4 is smaller than the presettable spacing or the operating spacing, then the signal strength of the input element 6 nearer to the signal source or the person 1 is greater than that of the input element 7 further remote from the signal source or the person 1.

The invention claimed is:

1. A control device of an operating element in a motor vehicle, the device comprising:
   a receiver that belongs to the operating element and capable of receiving signals emitted by a person, the receiver of the operating element having a first input element and a second input element that are arranged at a defined spacing from one another on an evaluation axis.

2. The control device defined in claim 1, wherein a quotient of a signal strength detected at the first input element of the receiver and a signal strength detected at the second input element of the receiver is the basis for measuring or determining of a spacing between the person and the operating element.

3. The control device defined in claim 1, further comprising:
   a portable transmitter carried by the person and that transmits a signal specific for the person.

4. The control device defined in claim 1, wherein an electrical field functioning as the signal is fed into the person.

5. The control device defined in claim 1, wherein the first input element and the second input element of the receiver are field sensors.

6. The control device defined in claim 5, wherein the field sensors of the receiver are magnetic field sensors that can evaluate a magnetic field corresponding to a signal transmitted by the transmitter or to an electrical field fed into the person.

7. The control device defined in claim 5, wherein the field sensors of the receiver are field plates.

8. The control device defined in claim 5, wherein the field sensors of the receiver are field coils.

9. The control device defined in claim 8, wherein each field coil has a capacitor that forms with the respective field coil a resonant circuit tuned to a frequency of the electrical field functioning as the signal.

10. The control device defined in claim 4, further comprising:
    a coupling member that can apply the signal to the body of the person.

11. The control device defined in claim 10, wherein the coupling member is mounted on a vehicle seat.

12. The control device defined in claim 10, wherein the coupling member is on a steering wheel of the vehicle.

13. The control device defined in claim 1, wherein the signals associated with different persons situated in the motor vehicle or with different vehicle seats are differentiated by a presettable chronological sequence of the signals.

14. The control device defined in claim 1, wherein the first input element and the second input element are positioned so that signal strengths detected by them, with a presettable spacing between them and signal source, are of equal magnitude.

15. The control device defined in claim 14, wherein the field plate or the field coil of the input element further remote from the signal source is bigger with regard to area or with more windings than the field plate or field coil of the input element nearer to the signal source.

16. The control device defined in claim 14, wherein the input element nearer to the signal source has a correspondingly configured signal attenuator.

* * * * *